United States Patent [19]

Kirchlechner et al.

[11] 3,929,880
[45] Dec. 30, 1975

[54] PROCESS FOR THE PREPARATION OF OXOCARBOXYLIC ACID AMIDES AND OXOCARBOXYLIC ACIDS

[75] Inventors: Richard Kirchlechner; Werner Rogalski; Jurgen Seubert, all of Darmstadt, Germany

[73] Assignee: Merck Patent Gesellschaft mit beschrankter Haftung, Darmstadt, Germany

[22] Filed: Jan. 3, 1974

[21] Appl. No.: 430,529

Related U.S. Application Data

[62] Division of Ser. No. 281,651, Aug. 18, 1972, Pat. No. 3,870,757.

[30] Foreign Application Priority Data

Aug. 21, 1971 Germany............................ 2141947

[52] U.S. Cl.... 260/559 A; 260/283 SY; 260/281 R; 260/287 R; 260/559 R
[51] Int. Cl.²........................................ C07C 103/19
[58] Field of Search...... 260/287 R, 281 R, 283 SY, 260/559 A, 559 R

[56] References Cited
UNITED STATES PATENTS

| | | | |
|---|---|---|---|
| 3,329,711 | 7/1967 | Hegedus et al. ................. | 260/559 A |
| 3,502,679 | 3/1970 | Houlihan et al. ................ | 260/559 R |
| 3,720,679 | 3/1973 | Feldman et al. .................... | 260/281 |

OTHER PUBLICATIONS
Olah, "Friedel Crafts and Related Reactions" 1964, pp. 944–946.

Primary Examiner—Donald G. Daus
Assistant Examiner—David E. Wheeler
Attorney, Agent, or Firm—Millen, Raptes & White

[57] ABSTRACT

Oxocarboxylic acid amides and oxocarboxylic acids, e.g., of the formula

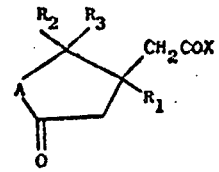

wherein X is $NH_2$ or OH, A is an aromatic, heteroaromatic or hydroaromatic ring or an optionally activated double bond and $R_1$, $R_2$ or $R_3$ are hydrogen atoms or a substituent, are produced by treating a cyclic dicarboxylic acid imide, preferably of the formula

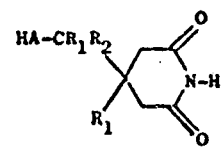

wherein $R_1$, $R_2$, $R_3$ and A have the values given above, with a Friedol-Crafts catalyst in the presence of a group, and then hydrolyzing the thus-produced oxocarboxylic acid amides ($X-NH_2$) to the corresponding free acids ($X-OH$).

3 Claims, No Drawings

PROCESS FOR THE PREPARATION OF OXOCARBOXYLIC ACID AMIDES AND OXOCARBOXYLIC ACIDS

BACKGROUND OF THE INVENTION

This is a division of application Ser. No. 281,651, filed Aug. 18, 1972, now U.S. Pat. No. 3,870,757.

This invention relates to a process for the preparation of oxocarboxylic acid amides and oxocarboxylic acids and to novel amides and acids thus-produced.

SUMMARY OF THE INVENTION

According to the process of this invention, γ-and δ-oxo-carboxylic acid amides are produced by treating a cyclic dicarboxylic acid imide with a Friedel-Crafts catalyst in the presence of a CH-C- group. Hydrolysis of the thus-produced amides produces the corresponding γ- and δ-oxo-carboxylic acid amides.

DETAILED DISCUSSION

The CH-C- group present during the treatment of the cyclic dicarboxylic acid imide with a Friedel-Crafts catalyst can be provided by a separate compound or by the imide itself. Examples of such separate compounds are aromatic cyclic compounds, e.g., benzene, naphthalene, phenanthrene, anthracene, thiophene, furan, benzopyran, benzofuran and thionaphthene and the corresponding compounds substituted with an $R_1$, $R_2$ or $R_3$ group or groups as defined hereinafter.

Preferably aromatic compounds are used, containing at least onne activating group. Examples are alkoxybenzenes as anisole; alkoxynaphthalenes as 2-ethoxynaphthalene; alkylbenzenes as toluene, ethylbenzene; alkylnaphthalenes as 1-methylnaphthalene.

Preferably the CH-C- group is present in the cyclic dicarboxylic acid imide itself and positioned so that internal cyclization can occur, i.e., the hydrogen bearing carbon atom of the CH-C- group is separated by a 3–4 carbon atom chain from one of the carbonyl groups of the imide group, thereby permitting the formation of a 5-membered or preferably 6-membered ring containing a carbonyl group γ- or δ- to the —$CONH_2$ group.

Thus, in a preferred embodiment of the process of this invention, cyclic oxo compounds of the general Formula I

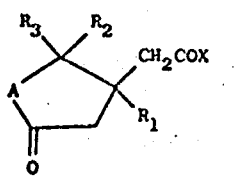

I wherein X is $NH_2$, A is a fused aromatic, heteroaromatic or hydroaromatic ring or an optionally activated double bond, and $R_1$, $R_2$ and $R_3$ are hydrogen atoms or substituents thereon, are produced by treating a cyclic dicarboxylic acid imide of the general Formula II

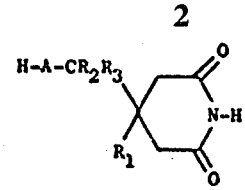

II wherein $R_1$, $R_2$, $R_3$ and A have the values given above, with a Friedal-Crafts catalyst.

The thus-obtained amide of Formula I (X—$NH_2$) is optionally converted, by treatment with a hydrolyzing agent, into a carboxylic acid of Formula I (X—OH); and, optionally, a free compound of the general Formula I is converted, by treatment with an acid or base, into a salt thereof, or the free base is liberated from a salt thereof by treatment with a base or acid.

In the formulae herein, $R_1$, $R_2$ and $R_3$ can be identical or different and are H or an organic radical, preferably alkyl or alkoxy of up to 6 carbon atoms, which optionally is mono- or polysubstituted, preferably by F, Cl or Br, or by OH, CN, $NH_2$ or $NO_2$;

A can be Ar, Q, $R_4$-C-C-$R_5$ or

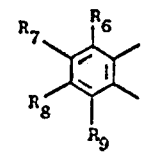

preferably the latter, wherein Ar is polycylcic arylene of up to 18 carbon atoms, optionally mono- or polysubstituted, e.g., by one or more $R_6$–$R_9$ groups;

Q is optionally mono- or polysubstituted, e.g., by one or more $R_6$–$R_9$ groups, heterocyclic aryl, e.g., 2,3-furandiyl, 2,3-benzo[b]furandiyl, 2,3-thiophenediyl, 2,3-thiophenediyl, 2,3-benzo[b]-thiophenediyl, 2,3-pyridinediyl-N-oxide, 2,3-quinolinediyl-N-oxide, 3,4-pyridinediyl-N-oxide, 3,4-quinolinediyl-N-oxide, or 3,4-isoquinolinediyl-N-oxide;

$R_4$ and $R_5$ have the same values as $R_1$, $R_2$ and $R_3$ and collectively can also be alkylene or alkenylene, preferably trimethylene or tetramethylene, and preferably mono- or polysubstituted;

$R_6$, $R_7$, $R_8$ and $R_9$ can be identical or different and are H or an inorganic or organic group; and X is OH or $NH_2$.

As will be apparent, in order for internal cyclization to occur, the hydrogen atom on A must be on a carbon atom which is δ- to a carbonyl radical of the imide group, i.e., H—A $CR_2R_3$— is a group of the formula H-C C-$CR_2R_3$-, preferably

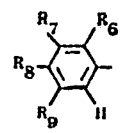

II wherein $R_6$–$R_9$ have the values given above, $R_1$ preferably being H or $CH_3$ and one of $R_2$ and $R_3$ preferably being H and the other preferably being H or $CH_3$, at least two of $R_6$–$R_9$ preferably being H and the remainder being H, F, Cl, Br, I, $CH_3$, $OCH_3$, $NO_2$ or $NH_2$.

The salts and quaternary ammonium compounds of Formula I are prepared from the free compounds in a conventional manner.

Prefered salts are the halogenides, sulfates and phosphates, which are prepared by combining a compound of formula I containing at least one amine group with HCl, HBr, HJ, $H_2SO_4$ and $H_3PO_4$. Quaternary compounds of formula I are especially the trimethyl and the triethylammonium derivatives of compounds of formula I containing at least one amine group. They are prepared by reacting the amine compound with methylor ethyl- halogenides or -sulfates e.g. methyliodide, ethylbromide, ethyliodide, dimethylsulfate or diethylsulfate. Both reactions can be conducted in the presence or absence of a solvent.

The compounds of Formula I and the physiologically acceptable salts and quaternary ammonium compounds thereof, possess valuable pharmaceutical properties, particularly excellent antiphlogistic characteristics accompanied by a good analgesic and antipyretic effect. They also manifest one or more of bacteriostatic, bactericidal, antiprotozoal, diuretic, blood-sugar-lowering, choloretic, cholesterol-level lowering, and radiation-protective activity. The compounds producible according to this invention and the physiologically acceptable salts thereof can thus be employed as drugs and also as intermediates for the preparation of other drugs.

The process of this invention can be utilized particularly advantageously in the preparation of tetracyclines.

The tetracycline syntheses described in the literature which promise an economical production of the tetracyclines employ as intermediates the aldehydes of the general Formula III

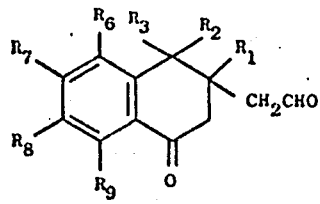     III wherein $R_1$ to $R_3$ and $R_6$ to $R_9$ have the values given above. These aldehydes can be prepared in accordance with conventional methods in a simple manner and in high yields from the oxocarboxylic acid amides (X $NH_2$) of Formula I wherein A is

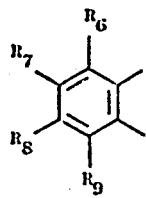

for example by dehydration to the corresponding nitrile and subsequent reductive hydrolysis.

Of the groups $R_1$, $R_2$ and $R_3$, preferred are branched or unbranched alkyl, e.g., methyl, ethyl, propyl, isopropyl, butyl, isobutyl, sec.-butyl, tert.-butyl, pentyl, isopentyl, hexyl, or isohexyl; branched or unbranched fluoroalkyls, e.g., fluoromethyl, difluoromethyl, trifluromethyl, 1-fluoroethyl, 2-fluoroethyl, 1-fluoropropyl, 2-fluoropropyl, 3-fluoropropyl, 1-fluorobutyl, 2-fluorobutyl, 3-fluorobutyl, 4-fluorobutyl, 1-fluoropentyl, 2-fluoropentyl, 3-fluoropentyl, 4-fluoropentyl, 5-fluoropentyl, 1-fluorohexyl, 2-fluorohexyl, 3-fluorohexyl, 4-fluorohexyl, 5-fluorohexyl or 6-fluorohexyl, as well as the corresponding chloro- or bromoalkyl residues. These groups can also be branched fluoroalkyl, chloroalkyl, or bromoalkyl. In addition to being monosubstituted, $R_1$, $R_2$ and $R_3$ can also be di-, tri-, poly- or perhalogenated, branched or unbranched alkyl.

When $R_1$ and $R_2$ are unsubstituted, mono- or polysubstituted alkoxy of up to 6 carbon atoms, preferably by fluorine, chlorine or bromine, examples are methoxy, ethoxy, propoxy, isopropoxy, butoxy, isobutoxy, sec.-butoxy, tert.-butoxy, pentoxy, isopentoxy, hexoxy, or isohexoxy, or, for examples, halogen derivatives of the above-mentioned groups, such as 1-chloromethoxy, 1-chloroethoxy, 2-chloroethoxy, 1-chloropropoxy, 2-chloropropoxy, 3-chloropropoxy, 1-chlorobutoxy, 2-chlorobutoxy, 3-chlorobutoxy, 4-chlorobutoxy, 1-chloropentoxy, 2-chloropentoxy, 3-chloropentoxy, 4-chloropentoxy, 5-chloropentoxy, 1-chlorohexoxy, 2-chlorohexoxy, 3-chlorohexoxy, 4-chlorohexoxy, 5-chlorohexoxy, and 6-chlorohexoxy, as well as the corresponding fluorins or bromo compounds. Correspondingly substituted branched alkoxy groups can also be employed. In addition to monohalogenated alkoxy, $R_1$ and $R_2$ can also be di-, tri-, or polyhalogenated, branched or unbranched alkoxy groups.

As stated above, $R_4$ and $R_5$ can be the same as $R_1$, $R_2$ or $R_3$. However, they preferably are mono- or polysubstituted alkylene or alkenylene, especially trimethylene or tetramethylene groups which can optionally be mono-unsaturated. $R_4$ and $R_5$ can also be, e.g., optionally unsaturated pentamethylene or hexamethylene groups. These alkylene and alkenylene groups can also be mono- or polysubstituted, e.g., by F, Cl, Br, or I; or by OH, $NO_2$, CN, $OR_{10}$, $CF_3$, $NH_2$, $NHR_{10}$, $NR_{10}R_{11}$, $NHCOR_{10}$ or $OCOR_{10}$.

$R_6$, $R_7$, and $R_9$, which can be identical or different, can be H or any organic or inorganic group, e.g., $R_1$–$R_5$ as defined herein and additionally $SO_3H$, $SO_2OR_{10}$, $SO_2NH_2$, $SO_2NHR_{10}$, $SO_2NR_{10}R_{11}$, SH, $SR_{10}$, $SOR_{10}$, or CN, wherein $R_{10}$ and $R_{11}$ are alike or different and are alkyl or up to 4 carbon atoms, e.g., as exemplified for $R_1$–$R_3$. Examples of $R_6$–$R_9$ groups are methyl, ethyl, propyl, isopropyl, butyl, isobutyl, sec.-butyl and tert.-butyl.

In addition to an ethenylene group substituted by $R_4$ and $R_5$ groups and/or an o-phenylene group substituted by the residues $R_6$ to $R_9$, A preferably is, e.g., 2,3-indenylene, 1,2-naphthylene, 2,3-naphthylene, 1,2-acenaphthenylene, 1,2-fluoroenylene, 1,2-anthracenylene, 1,2-phenanthrenylene, 9,10-phenanthrenylene, 1,2-pyrenylene, 4,5-pyrenylene, 1,2-chrysenylene, or 5,6-chrysenylene. These arylene groups can be substituted and/or partially hydrogenated. Suitable substituents are inorganic and/or organic, such as, for example, halogen, e.g., Cl, Br or I, $NO_2$, $SO_3H$, CN, OH, $NH_2$, $NHR_{10}$, $NR_{10}R_{11}$, $R_{10}$, COOH and $COR_{10}$ as defined above.

The compounds of Formula II are substituted glutarimides, preferably substituted 3-arylmethyl- or substituted 3-hetarylmethyl-glutarimides, i.e., heterocyclicarylmethyl, particularly substituted or unsubstituted 3-benzylglutarimides.

The starting compounds of Formula II are preferably prepared by reacting a compound of the general Formula IV $$H-A-CR_2R_3-Y \qquad IV$$

wherein Y is an equivalent of a metallic atom, preferably an alkali metal atom or MgZ, Z being Cl, Br or I, and $R_2$, $R_3$ and A having the values given above, with a compound of the general formula V

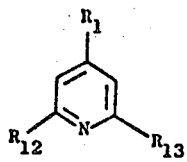   V wherein $R_{12}$ and $R_{13}$, which are identical or different, are halogen, preferably Cl or Br, or $OR_{10}$, and $R_1$ and $R_{10}$ have the values given above.

The compounds of Formula IV are known or can be produced in accordance with conventional methods, e.g., by reacting the corresponding halogenides of formula VI

   VI wherein $R_2$, $R_3$ and Z have the values given above, with metallic magnesium, preferably magnesium chips, in a suitable anhydrous solvent, e.g., an ether, such as diethyl ether, tetrahydrofuran and dioxane, optionally also with the addition of an inert solvent, such as benzene or toluene. When Y is an alkali metal atom, lithium is preferred.

The lithium compounds of Formula IV (Y = Li) are obtained, for example, by halogen-lithium exchange by means of another organolithium compound, e.g., butyllithium, in a suitable solvent, e.g., a hydrocarbon, including benzene or toluene or an ether, e.g., diethyl ether or tetrahydrofuran. It is also possible to react a halogen compound of Formula VI directly with metallic lithium in a suitable solvent.

The thus-obtained compounds of Formula IV are generally not isolated but instead further processed in solution.

The compounds of Formula V are known or can be produced according to conventional methods, e.g., by the halogenation of 2,6-dihydroxypyridines, e.g., 2,6-dihydroxy-4-methylpyridine, with $POCl_3$.

The reaction of a compound of the general Formula IV with a compound of the general Formula V is preferably effected in an inert organic solvent, e.g., an ether, such as diethyl ether, di-n-butyl ether, tetrahydrofuran and dioxane, or in a mixture of these ethers. If desired, further inert solvents can also be added, e.g., benzene or toluene. Preferably a solution of the organometallic compounds of general Formula IV is added, at a temperature of from −70° to +60°C., especially −10° to +35°C., to a solution of the pyridine derivative of Formula V. After the reaction has taken place, the usual reaction times being from 15 minutes to 24 hours, excess organometallic compound is decomposed in a conventional manner, e.g., with an aqueous $NH_4Cl$ solution. The reaction mixture is then worked up in accordance with known procedures.

The preparation of oxocarboxylic acid amides of Formula I (X = $NH_2$) can be accomplished by reacting a substituted or unsubstituted cyclic imide, e.g., succinimide, glutarimide, or phthalimide, with a cyclic or open-chain unsaturated compound, preferably an aromatic or heteroaromatic compound, in the present of a Friedel-Crafts catalyst.

Suitable Friedel-crafts catalysts are Lewis acids, preferably nonmetallic halogenides, such as $BF_3$ or $BCl_3$; metallic halides, such as $AlCl_3$, $AlBr_3$, $ZnCl_2$, $SnCl_4$, $SbF_5$ or $SbCl_5$; or also protonic acids, such as HF, HCl, $H_2SO_4$, $H_3PO_4$, or polyphosphoric acids. Liquid HF and polyphosphoric acid are preferred.

The reaction can be conducting in the presence or absence of a solvent. Examples of suitable solvents are $CS_2$, hydrocarbons, such as hexane, heptane, cyclohexane and tetrahydronaphthalene, halogenated hydrocarbons, e.g., $CH_2Cl_2$, $CCl_4$, 1,2-dichloroethane, perchlorobutadiene, chlorobenzene, bromobenzene, and mixtures thereof. By the use of a liquid catalyst, e.g., liquid hydrogen fluoride or polyphosphoric acid, it is also possible to effect the reaction without the addition of a further solvent.

Reaction temperatures generally range from −20° to +120° C., depending on the catalyst employed, preferably 0° to the boiling point of the reaction mixture. The reaction times generally range from about 2 hours to 6 days.

The molar ratio of Friedel-Crafts-catalyst to reactant usually ranges from 0,9 to 2,0 preferably from 1,1–1,4.

A particularly preferred method is to dissolve a starting compound of Formula II in liquid hydrogen fluoride and allow the solution to stand for a relatively long period of time, e.g., 20 to 80 hours, at room temperature. After termination of the reaction, the largest portion of the hydrogen fluoride is distilled off and the residue worked up as usual.

The thus-obtained oxocarboxylic acid amides can, if desired, be converted into oxocarboxylic acids in a conventional manner by treatment with a hydrolyzing agent. For example, the oxocarboxylic acid amides can be heated in an aqueous solution of an acid, e.g., mineral acids, including HCl, HBr, $H_2SO_4$ and $H_3PO_4$, or organic acids, e.g., aliphatic carboxylic acids, preferably $ClCH_2COOH$, $Cl_2CHCOOH$, $Cl_3CCOOH$ and $CF_3COOH$, aliphatic or aromatic sulfonic acids, e.g., $CH_3SO_3H$, $CH_3CH_2SO_3H$, $HOCH_2CH_2SO_3H$ and p-toluenesulfonic acid, p-bromosulfonic acid and naphthalene-mono- and -disulfonic acids. The reaction is conducted at an elevated temperature, e.g., 60° to 160° C., and, if necessary, under elevated pressure, but preferably under normal pressure and at the boiling point of the reaction mixture. The reaction times are generally about 1 hour to 8 hours, depending on the reaction conditions.

It is also possible to utilize aqueous bases as hydrolyzing agents. Preferred are aqueous solutions of alkali or alkaline earth metal hydroxides, e.g., NaOH, KOH, $Ca(OH)_2$ and $Ba(OH)_2$. Aqueous solutions of basic salts, e.g., of alkali carbonates, particularly $Na_2CO_3$ or $K_2CO_3$, can also be employed. The hydrolysis is conducted at an elevated temperature, preferably from 60° to 140° C., especially at the boiling point of the reaction mixture, optionally under elevated pressure of up to 20 atmospheres. The reaction times generally range from about 30 minutes to 6 hours.

A compound of formula I can be converted into an acid addition salt thereof with an acid. For this reaction, those acids are preferred which yield physiologically acceptable salts. Thus, it is possible to use organic and inorganic acids, such as, e.g., aliphatic, alicyclic, araliphatic, aromatic or heterocyclic mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maloic acid, lactic acid, tartaric acid, malic acid, aminocarboxylic acids, sulfamic acid, benzoic acid, salicyclic acid, phenylpropionic acid, citric acid, gluconic acid, ascorbic acid, nicotinic acid, isonicotinic acid, methanesulfonic acid, ethanedisulfonic acid, β-hydroxyethanesulfonic acid, p-toluenesulfonic acid, naphthalene-mono- and -disulfonic acids, sulfuric acid, nitric acid, hydrohalic acids, such as hydrochloric acid or hydrobromic acid, or phosphoric acids, e.g., orthophosphoric acid.

Free acids of Formula I (X = OH) can be converted, by reaction with a base, into one of the physiologically acceptable metal and/or ammonium salts thereof. Suitable salts are, in particular, the sodium potassium, magnesium, calcium and ammonium and substituted ammonium salts, such as, for example, the dimethyl- and diethylammonium, monoethanol-, diethanol-, and triethanolammonium, cyclohexylammonium, dicyclohexylammonium and dibenzylethylenediammonium salts.

Conversely, compounds of Formula I can be liberated in free form from the acid addition salts thereof by treatment with strong bases, such as sodium or potassium hydroxide, sodium or potassium carbonate, and/or from the metal and ammonium salts thereof by treatment with acids, particularly mineral acids, e.g., hydrochloric or sulfuric acid.

The compounds of Formula I obtainable according to the invention can optionally be converted into the quaternary salts associated therewith by treatment with an alkylating agent, thereby introducing, e.g., a lower alkyl group of 1–4 carbon atoms and/or a benzyl group. Suitable quaternizing agents are alkyl halogenides, such as methyl iodide, ethyl bromide, isopropyl chloride, n-butyl bromide, or dialkyl sulfates, such as dimethyl sulfate, diethyl sulfate, as well as benzyl halogenides, particularly benzyl bromide. The quaternization is conducted according to the methods known, for example, from Houben-Weyl, "Methoden der organischen Chemie" [Methods of Organic Chemistry], George Thieme publishers, Stuttgart, Vol. 4, 3rd Edition (1941), pp. 657 et seq., for the quaternization of tertiary amines.

The compounds of Formula I contain a center of asymmetry and are ordinarily present in the racemic form. In case two centers of asymmetry exist, the compounds are generally obtained in the synthesis as a mixture of two racemates, from which the individual racemates can be isolated in a conventional manner, for example by repeated recrystallization from suitable solvents, and can thus be obtained in the pure form.

The racemates can be separated into their optical antipodes according to a plurality of known methods as set forth in the literature. Thus, some racemic mixtures can be precipitated as eutectics instead of in the form of mixed crystals and can thus be separated, and in these cases a selective precipitation can likewise be possible. However, the method of chemical separation is to be preferred. According to this method, diastereomers are formed from the racemic mixture by reaction with an optically active auxiliary agent. Preferably, an optically active base is reacted with the carboxyl group of a compound of Formula I (X = OH). For example, diastereomeric salts of the compounds of Formula I can be formed with optically active amines, such as quinine, cinchonidine, brucine, cinchonine, hydroxyhydrindamine, morphine, 1-phenylethylamine, 1-naphthylethylamine, phenyloxynaphthylmethylamine, quinidine, strychnine, basic amino acids, such )-mandelic lysine, arginine, amino acid esters, or with optically active acids, such as (+)- and (−)-tartaric acid, dibenzoyl-(+)- and -(−)-tartaric acid, diacetyl-(+)- and -(−)-tartaric acid, camphoric acid, β-camphorsulfonic acid, (+)- and (−)-mandelic acid, (+)- and (−)-malic acid, (+)- and (−)-2-phenylbutyric acid, (+)- and (−)-dinitrodiphenic acid, or (+)- and (−)-lactic acid. In a similar manner, ester diastereomers can be produced by the esterification of compounds of Formula I (X = OH) with optically active alcohols, e.g., borneol, methanol, 2-octanol. The difference in the solubility of the thus-obtained diastereomeric salts and/or esters permits the selective crystallization of one form and the regeneration of the respectively optically active compounds from the mixture.

The hydroxy substituted acids of Formula I (X = OH); one or more of $R_6$, $R_7$, $R_8$ and $R_9$ = OH) and the hydroxy substituted amides of Formula I (X = NH$_2$; one or more of $R_6$, $R_7$, $R_8$ and $R_9$ = OH) can be converted, by esterification with one of the above-mentioned optically active acids, into suitable diastereomeric esters which can be separated due to their differing solubilities. The optically active compounds of Formula I are in each case obtained by saponification of the pure diastereomer. However, it is also possible first to produce the acidic phthalic acid esters and succinic acid esters, respectively, with phthalic acid anhydride and succinic acid anhydride, respectively, and convert the thus-obtained dibasic acids into the diastereomeric salts with one of the above-mentioned optically active bases, and then obtain therefrom the pure enantiomers. The separation of the racemates and/or racemate mixtures with the aid of chromatographical methods is particularly advantageous. In this connection, it is possible either to use optically active substrate materials, such as, for example, tartaric acid, starch, cane sugar, cellulose or acetylated cellulose, and optically inactive and/or optically active eluents for separation into the pure enantiomers, or to employ an optically inactive substrate material, such as, for example, silica gel or aluminum oxide in combination with an optically active eluent. The optical antipodes can also be separated biochemically with the use of selective, enzymatic reactions. Thus, the racemic acids of Formula I (X = OH) can be exposed to an asymmetrical oxidase or optionally decarboxylase which destroys one form by oxidation or decarboxylation, while the other forms remain unaltered. It is furthermore possible to subject an amide of Formula I (X = NH$_2$) to the effect of a hydrolase which selectively saponifies one enantiomer and leaves the other one unchanged.

The novel compounds can be employed in a mixture with solid, liquid and/or semiliquid excipients as drugs in the human or veterinary medicine. Suitable carriers are those organic or inorganic substances suitable for parenteral, enteral, or topical application and which do not react with the novel compounds, such as, for example, water, vegetable oils, benzyl alcohols, polyethylene glycols, gelatin, lactose, amylose, magnesium stearate, talc, vaseline, cholesterol. Suitable for parenteral application are especially solutions, preferably oily or aqueous solutions, as well as suspensions, emulsions, or implants. For enteral application, suitable are tablets, dragees, syrups, elixirs, or suppositories, and for topical application, salves, creams or powders. The preparations described herein can optionally be sterilized or mixed with auxiliary agents, such as lubricants, preservatives, stabilizers, or wetting agents, emulsifiers, salts for influencing the osmotic pressure, buffers, coloring, flavoring and/or aromatous substances.

The compounds are preferably administered in a dosage from 0.1 to 2000 mg. per dosage unit.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees C.

EXAMPLE 1

374 G. of 3-(2-chloro-5-methoxybenzyl)-3-methylglutarimide (m.p. 126°–127°; obtainable from 2-chloro-5-methoxybenzylmagnesium chloride and 2,6-dichloro-4-methylpyridine) is dissolved in 4 l. of liquid hydrogen fluoride; the solution is allowed to stand for 72 hours at room temperature, the hydrogen fluoride is distilled off, the residue is stirred with ice water, extracted with chloroform, washed with aqueous sodium carbonate solution and water, dried over $Na_2SO_4$, and the solvent is distilled off, thus obtaining 5-chloro-8-methoxy-3-methyl-1-oxo-1,2,3,4-tetrahydro-3-naphthylacetamide, m.p. 208°–209° (from methanol).

Analogously, using the following starting compounds:

3-benzyl-3-methylglutarimide
3-(2-fluorobenzyl)-3-methylglutarimide
3-(3-fluorobenzyl)-3-methylglutarimide
3-(4-fluorobenzyl)-3-methylglutarimide
3-(2-chlorobenzyl)-3-methylglutarimide
3-(3-chlorobenzyl)-3-methylglutarimide
3-(4-chlorobenzyl)-3-methylglutarimide
3-(2-bromobenzyl)-3-methylglutarimide
3-(3-bromobenzyl)-3-methylglutarimide
3-(4-bromobenzyl)-3-methylglutarimide
3-(2-iodobenzyl)-3-methylglutarimide
3-(3-iodobenzyl)-3-methylglutarimide
3-(4-iodobenzyl)-3-methylglutarimide
3-(2-hydroxybenzyl)-3-methylglutarimide
3-(3-hydroxybenzyl)-3-methylglutarimide
3-(4-hydroxybenzyl)-3-methylglutarimide
3-(2-methoxybenzyl)-3-methylglutarimide
3-(3-methoxybenzyl)-3-methylglutarimide
3-(4-methoxybenzyl)-3-methylglutarimide
3-(2-butoxybenzyl)-3-methylglutarimide
3-(3-butoxybenzyl)-3-methylglutarimide
3-(4-butoxybenzyl)-3-methylglutarimide
3-(2-methylbenzyl)-3-methylglutarimide
3-(3-methylbenzyl)-3-methylglutarimide
3-(4-methylbenzyl)-3-methylglutarimide
3-(2-isopropylbenzyl)-3-methylglutarimide
3-(3-isopropylbenzyl)-3-methylglutarimide
3-(4-isopropylbenzyl)-3-methylglutarimide
3-(2-butylbenzyl)-3-methylglutarimide
3-(3-butylbenzyl)-3-methylglutarimide
3-(4-butylbenzyl)-3-methylglutarimide
3-(2-trifluoromethylbenzyl)-3-methylglutarimide
3-(3-trifluoromethylbenzyl)-3-methylglutarimide
3-(4-trifluoromethylbenzyl)-3-methylglutarimide
3-(2-aminobenzyl)-3-methylglutarimide
3-(3-aminobenzyl)-3-methylglutarimide
3-(4-aminobenzyl)-3-methylglutarimide
3-(2-dimethylaminobenzyl)-3-methylglutarimide
3-(3-dimethylaminobenzyl)-3-methylglutarimide
3-(4-dimethylaminobenzyl)-3-methylglutarimide
3-(2-acetylaminobenzyl)-3-methylglutarimide
3-(3-acetylaminobenzyl)-3-methylglutarimide
3-(4-acetylaminobenzyl)-3-methylglutarimide
3-(2-acetoxybenzyl)-3-methylglutarimide
3-(3-acetoxybenzyl)-3-methylglutarimide
3-(4-acetoxybenzyl)-3-methylglutarimide
3-(2,3-dihydroxybenzyl)-3-methylglutarimide
3-(2,4-dihydroxybenzyl)-3-methylglutarimide
3-(2,5-dihydroxybenzyl)-3-methylglutarimide
3-(3,4-dihydroxybenzyl)-3-methylglutarimide
3-(3,5-dihydroxybenzyl)-3-methylglutarimide
3-(2,3-dimethoxybenzyl)-3-methylglutarimide
3-(2,4-dimethoxybenzyl)-3-methylglutarimide
3-(2,5-dimethoxybenzyl)-3-methylglutarimide
3-(3,4-dimethoxybenzyl)-3-methylglutarimide
3-(3,5-dimethoxybenzyl)-3-methylglutarimide
3-(2,5-dibutoxybenzyl)-3-methylglutarimide
3-(3,4-dibutoxybenzyl)-3-methylglutarimide
3-(3,5-dibutoxybenzyl)-3-methylglutarimide
3-(2,3-dimethylbenzyl)-3-methylglutarimide
3-(2,4-dimethylbenzyl)-3-methylglutarimide
3-(2,5-dimethylbenzyl)-3-methylglutarimide
3-(3,4-dimethylbenzyl)-3-methylglutarimide
3-(3,5-dimethylbenzyl)-3-methylglutarimide
3-(2,3-diacetoxybenzyl)-3-methylglutarimide
3-(2,4-diacetoxybenzyl)-3-methylglutarimide
3-(2,5-diacetoxybenzyl)-3-methylglutarimide
3-(3,4-diacetoxybenzyl)-3-methylglutarimide
3-(3,5-diacetoxybenzyl)-3-methylglutarimide
3-(2-fluoro-5-hydroxybenzyl)-3-methylglutarimide
3-(3-fluoro-5-hydroxybenzyl)-3-methylglutarimide
3-(4-fluoro-3-hydroxybenzyl)-3-methylglutarimide
3-(2-chloro-3-hydroxybenzyl)-3-methylglutarimide
3-(2-chloro-5-hydroxybenzyl)-3-methylglutarimide
3-(3-chloro-2-hydroxybenzyl)-3-methylglutarimide
3-(3-chloro-5-hydroxybenzyl)-3-methylglutarimide
3-(4-chloro-2-hydroxybenzyl)-3-methylglutarimide
3-(4-chloro-3-hydroxybenzyl)-3-methylglutarimide
3-(2-bromo-5-hydroxybenzyl)-3-methylglutarimide
3-(3-bromo-5-hydroxybenzyl)-3-methylglutarimide
3-(4-bromo-3-hydroxybenzyl)-3-methylglutarimide
3-(2-iodo-5-hydroxybenzyl)-3-methylglutarimide
3-(3-iodo-5-hydroxybenzyl)-3-methylglutarimide
3-(4-iodo-3-hydroxybenzyl)-3-methylglutarimide
3-(2-nitro-5-hydroxybenzyl)-3-methylglutarimide
3-(3-nitro-5-hydroxybenzyl)-3-methylglutarimide
3-(4-nitro-3-hydroxybenzyl)-3-methylglutarimide
3-(2-trifluoromethyl-5-hydroxybenzyl)-3-methylglutarimide
3-(3-trifluoromethyl-5-hydroxybenzyl)-3-methylglutarimide
3-(4-trifluoromethyl-3-hydroxybenzyl)-3-methylglutarimide
3-(2-fluoro-5-methoxybenzyl)-3-methylglutarimide
3-(3-fluoro-5-methoxybenzyl)-3-methylglutarimide
3-(4-fluoro-3-methoxybenzyl)-3-methylglutarimide
3-(2-chloro-3-methoxybenzyl)-3-methylglutarimide
3-(2-chloro-5-methoxybenzyl)-3-methylglutarimide
3-(3-chloro-2-methoxybenzyl)-3-methylglutarimide
3-(3-chloro-5-methoxybenzyl)-3-methylglutarimide
3-(4-chloro-3-methoxybenzyl)-3-methylglutarimide
3-(2-bromo-5-methoxybenzyl)-3-methylglutarimide
3-(3-bromo-5-methoxybenzyl)-3-methylglutarimide
3-(4-bromo-3-methoxybenzyl)-3-methylglutarimide
3-(2-hydroxy-3-methoxybenzyl)-3-methylglutarimide
3-(2-hydroxy-4-methoxybenzyl)-3-methylglutarimide 3-(2-hydroxy-5-methoxybenzyl)-3-methylglutarimide
3-(3-hydroxy-2-methoxybenzyl)-3-methylglutarimide
3-(3-hydroxy-4-methoxybenzyl)-3-methylglutarimide
3-(3-hydroxy-5-methoxybenzyl)-3-methylglutarimide
3-(4-hydroxy-2-methoxybenzyl)-3-methylglutarimide
3-(4-hydroxy-3-methoxybenzyl)-3-methylglutarimide
3-(2-chloro-5-butoxybenzyl)-3-methylglutarimide
3-(3chloro-5-butoxybenzyl)-3-methylglutarimide
3-(4-chloro-3-butoxybenzyl)-3-methylglutarimide
3-(2-chloro-5-methylbenzyl)-3-methylglutarimide
3(3-chloro-5-methylbenzyl)-3-methylglutarimide
3-(4-chloro-3-methylbenzyl)-3-methylglutarimide
3-(2-chloro-3-aminobenzyl)-3-methylglutarimide
3-(2-chloro-5-aminobenzyl)-3-methylglutarimide
3-(3-chloro-2-aminobenzyl)-3-methylglutarimide
3-(3-chloro-5-aminobenzyl)-3-methylglutarimide
3-(4-chloro-3-aminobenzyl)-3-methylglutarimide
3-(2-chloro-5-dimethylaminobenzyl)-3-methylglutarimide
3-(2-methyl-5-hydroxybenzyl)-3-methylglutarimide
3-(2-butyl-5-hydroxybenzyl)-3-methylglutarimide
3-(2-amino-5-hydroxybenzyl)-3-methylglutarimide
3-(3-amino-5-hydroxybenzyl)-3-methylglutarimide
3-(2-dimethylamino-5-hydroxybenzyl)-3-methylglutarimide the following products are obtained by treatment with liquid hydrogen fluoride:

3-methyl-1-oxo-1,2,3,4-tetrahydro-3-naphthylacetamide, m.p. 125°–126°
5-fluoro-3-methyl-1-oxo-1,2,3,4-tetrahydro-3-naphthylacetamide
6-fluoro-3-methyl-1-oxo-1,2,3,4-tetrahydro-3-naphthylacetamide
7-fluoro-3-methyl-1-oxo-1,2,3,4-tetrahydro-3-naphthylacetamide
5-chloro-3-methyl-1-oxo-1,2,3,4-tetrahydro-3-naphthylacetamide
6-chloro-3-methyl-1-oxo-1,2,3,4-tetrahydro-3-naphthylacetamide
7-chloro-3-methyl-1-oxo-1,2,3,4-tetrahydro-3-naphthylacetamide
5-bromo-3-methyl-1-oxo-1,2,3,4-tetrahydro-3-naphthylacetamide
6-bromo-3-methyl-1-oxo-1,2,3,4-tetrahydro-3-naphthylacetamide
7-bromo-3-methyl-1-oxo-1,2,3,4-tetrahydro-3-naphthylacetamide
5-iodo-3-methyl-1-oxo-1,2,3,4-tetrahydro-3-naphthylacetamide
6-iodo-3-methyl-1-oxo-1,2,3,4-tetrahydro-3-naphthylacetamide
7-iodo-3-methyl-1-oxo-1,2,3,4-tetrahydro-3-napthylacetamide
5-hydroxy-3-methyl-1-oxo-1,2,3,4-tetrahydro-3-naphthylacetamide
6-hydroxy-3-methyl-1-oxo-1,2,3,4-tetrahydro-3-naphthylacetamide
7-hydroxy-3-methyl-1-oxo-1,2,3,4-tetrahydro-3-naphthylacetamide
8-hydroxy-3-methyl-1-oxo-1,2,3,4-tetrahydro-3-naphthylacetamide
5-methoxy-3-methyl-1-oxo-1,2,3,4-tetrahydro-3-naphthylacetamide
6-methoxy-3-methyl-1-oxo-1,2,3,4-tetrahydro-3-naphthylacetamide
7-methoxy-3-methyl-1-oxo-1,2,3,4-tetrahydro-3-naphthylacetamide
8-methoxy-3-methyl-1-oxo-1,2,3,4-tetrahydro-3-naphthylacetamide
5-butoxy-3-methyl-1-oxo-1,2,3,4-tetrahydro-3-naphthylacetamide
6-butoxy-3-methyl-1-oxo-1,2,3,4-tetrahydro-3-naphthlacetamide
7-butoxy-3-methyl-1-oxo-1,2,3,4-tetrahydro-3-naphthylacetamide
3,5-dimethyl-1-oxo-1,2,3,4-tetrahydro-3-naphthylacetamide
3,6-dimethyl-1-oxo-1,2,3,4-tetrahydro-3-naphthylacetamide
3,7-dimethyl-1-oxo-1,2,3,4-tetrahydro-3-naphthylacetamide
5-isopropyl-3-methyl-1-oxo-1,2,3,4-tetrahydro-3-naphthylacetamide
6-isopropyl-3-methyl-1-oxo-1,2,3,4-tetrahydro-3-naphthylacetamide
7-isopropyl-3-methyl-1-oxo-1,2,3,4-tetrahydro-3-naphthylacetamide
5-butyl-3-methyl-1-oxo-1,2,3,4-tetrahydro-3-naphthylacetamide
6-butyl-3-methyl-1-oxo-1,2,3,4-tetrahydro-3-naphthylacetamide
7-butyl-3-methyl-1-oxo-1,2,3,4-tetrahydro-3-naphthylacetamide
5-trifluoromethyl-3-methyl-1-oxo-1,2,3,4-tetrahydro-3naphthylacetamide
6-trifluoromethyl-3-methyl-1-oxo-1,2,3,4-tetrahydro-3-naphthylacetamide
7-trifluoromethyl-3-methyl-1-oxo-1,2,3,4-tetrahydro-3-naphthylacetamide
5-amino-3-methyl-1-oxo-1,2,3,4-tetrahydro-3-naphthylacetamide
6-amino-3-methyl-1-oxo-1,2,3,4-tetrahydro-3-naphthylacetamide
7-amino-3-methyl-1-oxo-1,2,3,4-tetrahydro-3-naphthylacetamide
8-amino-3-methyl-1-oxo-1,2,3,4-tetrahydro-3-naphthylacetamide
5-dimethylamino-3-methyl-1-oxo-1,2,3,4-tetrahydro-3-naphthylacetamide
6-dimethylamino-3-methyl-1-oxo-1,2,3,4-tetrahydro-3-naphthylacetamide
7-dimethylamino-3-methyl-1-oxo-1,2,3,4-tetrahydro-3-naphthylacetamide
8-dimethylamino-3-methyl-1-oxo-1,2,3,4-tetrahydro-3-naphthylacetamide
5-acetylamino-3-methyl-1-oxo-1,2,3,4-tetrahydro-3-naphthylacetamide
6-acetylamino-3-methyl-1-oxo-1,2,3,4-tetrahydro-3-naphthylacetamide
7-acetylamino-3-methyl-1-oxo-1,2,3,4-tetrahydro-3-naphthylacetamide
8-acetylamino-3-methyl-1-oxo-1,2,3,4-tetrahydro-3-naphthylacetamide
5-acetoxy-3-methyl-1-oxo-1,2,3,4-tetrahydro-3-naphthylacetamide
6-acetoxy-3-methyl-1-oxo-1,2,3,4-tetrahydro-3-naphthylacetamide
7-acetoxy-3-methyl-1-oxo-1,2,3,4-tetrahydro-3-naphthylacetamide 5,6-dihydroxy-3-methyl-1-oxo-1,2,3,4-tetrahydro-3-naphthylacetamide
5,7-dihydroxy-3-methyl-1-oxo-1,2,3,4-tetrahydro-3-naphthylacetamide
5,8-dihydroxy-3-methyl-1-oxo-1,2,3,4-tetrahydro-3-naphthylacetamide
6,7-dihydroxy-3-methyl-1-oxo-1,2,3,4-tetrahydro-3-naphthylacetamide
7,8-dihydroxy-3-methyl-1-oxo-1,2,3,4-tetrahydro-3-naphthylacetamide
6,8-dihydroxy-3-methyl-1-oxo-1,2,3,4-tetrahydro-3-naphthylacetamide
5,6-dimethoxy-3-methyl-1-oxo-1,2,3,4-tetrahydro-3-naphthylacetamide
5,7-dimethoxy-3-methyl-1-oxo-1,2,3,4-tetrahydro-3-naphthylacetamide
5,8-dimethoxy-3-methyl-1-oxo-1,2,3,4-tetrahydro-3-naphthylacetamide, m.p. 183°–184°
6,7-dimethoxy-3-methyl-1-oxo-1,2,3,4-tetrahydro-3-naphthylacetamide
7,8-dimethoxy-3-methyl-1-oxo-1,2,3,4-tetrahydro-3-naphthylacetamide
6,8-dimethoxy-3-methyl-1-oxo-1,2,3,4-tetrahydro-3-naphthylacetamide, m.p. 197°–198°
5,8-dibutoxy-3-methyl-1-oxo-1,2,3,4-tetrahydro-3-naphthylacetamide
6,7-dibutoxy-3-methyl-1-oxo-1,2,3,4-tetrahydro-3-naphythylacetamide
7,8-dibutoxy-3-methyl-1-oxo-1,2,3,4-tetrahydro-3-naphthylacetamide
6,8-dibutoxy-3-methyl-1-oxo-1,2,3,4-tetrahydro-3-naphythylacetamide
3,5,6-trimethyl-1-oxo-1,2,3,4-tetrahydro-3-naphthylacetamide
3,5,7-trimethyl-1-oxo-1,2,3,4-tetrahydro-3-naphthylacetamide
3,5,8-trimethyl-1-oxo-1,2,3,4-tetrahydro-3-naphthylacetamide
3,6,7-trimethyl-1-oxo-1,2,3,4-tetrahydro-3-naphthylacetamide
3,7,8-trimethyl-1-oxo-1,2,3,4-tetrahydro-3-naphthylacetamide
3,6,8-trimethyl-1-oxo-1,2,3,4-tetrahydro-3-naphthylacetamide
5,6-diacetoxy-3-methyl-1-oxo-1,2,3,4-tetrahydro-3-naphthylacetamide
5,7-diacetoxy-3-methyl-1-oxo-1,2,3,4-tetrahydro-3naphthylacetamide
5,8-diacetoxy-3-methyl-1-oxo-1,2,3,4-tetrahydro-3-naphthylacetamide
6,7-diacetoxy-3-methyl-1-oxo-1,2,3,4-tetrahydro-3-naphthylacetamide
7,8-diacetoxy-3-methyl-1-oxo-1,2,3,4-tetrahydro-3-naphthylacetamide
6,8-diacetoxy-3-methyl-1-oxo-1,2,3,4-tetrahydro-3-naphthylacetamide
5-fluoro-8-hydroxy-3-methyl-1-oxo-1,2,3,4-tetrahydro-3-naphthylacetamide
6-fluoro-8-hydroxy-3-methyl-1-oxo-1,2,3,4-tetrahydro-3-naphthylacetamide
8-fluoro-6-hydroxy-3-methyl-1-oxo-1,2,3,4-tetrahydro-3-naphthylacetamide
7-fluoro-6-hydroxy-3-methyl-1-oxo-1,2,3,4-tetrahydro-3-naphthylacetamide
7-fluoro-8-hydroxy-3-methyl-1-oxo-1,2,3,4-tetrahydro-3-naphthylacetamide
5-chloro-6-hydroxy-3-methyl-1-oxo-1,2,3,4-tetrahydro-3-naphthylacetamide
5-chloro-8-hydroxy-3-methyl-1-oxo-1,2,3,4-tetrahydro-3-naphthylacetamide
6-chloro-5-hydroxy-3-methyl-1-oxo-1,2,3,4-tetrahydro-3-naphthylacetamide
6-chloro-8-hydroxy-3-methyl-1-oxo-1,2,3,4-tetrahydro-3-naphthylacetamide
8-chloro-6-hydroxy-3-methyl-1-oxo-1,2,3,4-tetrahydro-3-naphthylacetamide
7-chloro-5-hydroxy-3-methyl-1-oxo-1,2,3,4-tetrahydro-3-naphthylacetamide
7-chloro-6-hydroxy-3-methyl-1-oxo-1,2,3,4-tetrahydro-3-naphthylacetamide
7-chloro-8-hydroxy-3-methyl-1-oxo-1,2,3,4-tetrahydro-3-naphthylacetamide
5-bromo-8-hydroxy-3-methyl-1-oxo-1,2,3,4-tetrahydro-3-naphthylacetamide
6-bromo-8-hydroxy-3-methyl-1-oxo-1,2,3,4-tetrahydro-3-naphthylacetamide
8-bromo-6-hydroxy-3-methyl-1-oxo-1,2,3,4-tetrahydro-3-naphthylacetamide
7-bromo-6-hydroxy-3-methyl-1-oxo-1,2,3,4-tetrahydro-3-naphthylacetamide
7-bromo-8-hydroxy-3-methyl-1-oxo-1,2,3,4-tetrahydro-3-naphthylacetamide
5-iodo-8-hydroxy-3-methyl-1-oxo-1,2,3,4-tetrahydro-3-naphthylacetamide
6-iodo-8-hydroxy-3-methyl-1-oxo-1,2,3,4-tetrahydro-3-naphthylacetamide
8-iodo-6-hydroxy-3-methyl-1-oxo-1,2,3,4-tetrahydro-3-naphthylacetamide
7-iodo-6-hydroxy-3-methyl-1-oxo-1,2,3,4-tetrahydro-3-naphthylacetamide
7-iodo-8-hydroxy-3-methyl-1-oxo-1,2,3,4-tetrahydro-3-naphthylacetamide
5-nitro-8-hydroxy-3-methyl-1-oxo-1,2,3,4-tetrahydro-3-naphthylacetamide
6-nitro-8-hydroxy-3-methyl-1-oxo-1,2,3,4-tetrahydro-3naphthylacetamide
8-nitro-6-hydroxy-3-methyl-1-oxo-1,2,3,4-tetrahydro-3-naphthylacetamide
7-nitro-6-hydroxy-3-methyl-1-oxo-1,2,3,4-tetrahydro-3-naphthylacetamide
7-nitro-8-hydroxy-3-methyl-1-oxo-1,2,3,4-tetrahydro-3-naphthylacetamide
5-fluoro-8-methoxy-3-methyl-1-oxo-1,2,3,4-tetrahydro-3-naphthylacetamide
6-fluoro-8-methoxy-3-methyl-1-oxo-1,2,3,4-tetrahydro-3-naphthylacetamide
8-fluoro-6-methoxy-3-methyl-1-oxo-1,2,3,4-tetrahydro-3-naphthylacetamide
7-fluoro-6-methoxy-3-methyl-1-oxo-1,2,3,4-tetrahydro-3-naphthylacetamide
7-fluoro-8-methoxy-3-methyl-1-oxo-1,2,3,4-tetrahydro-3-naphthylacetamide
6-chloro-8-methoxy-3-methyl-1-oxo-1,2,3,4-tetrahydro-3-naphthylacetamide
8-chloro-6-methoxy-3-methyl-1-oxo-1,2,3,4-tetrahydro-3-naphthylacetamide
7-chloro-6-methoxy-3-methyl-1-oxo-1,2,3,4-tetrahydro-3-naphthylacetamide
7-chloro-8-methoxy-3-methyl-1-oxo-1,2,3,4-tetrahydro-3-naphthylacetamide
5-bromo-8-methoxy-3-methyl-1-oxo-1,2,3,4-tetrahydro-3-naphthylacetamide, m.p. 204°
6-bromo-8-methoxy-3-methyl-1-oxo-1,2,3,4-tetrahydro-3-naphthylacetamide
8-bromo-6-methoxy-3-methyl-1-oxo-1,2,3,4-tetrahydro-3-naphthylacetamide 7-bromo-6-methoxy-3-methyl-1-oxo-1,2,3,4-tetrahydro-3-naphthylacetamide
7-bromo-8-methoxy-3-methyl-1-oxo-1,2,3,4-tetrahydro-3-naphthylacetamide
5-hydroxy-6-methoxy-3-methyl-1-oxo-1,2,3,4-tetrahydro-3-naphthylacetamide
5-hydroxy-7-methoxy-3-methyl-1-oxo-1,2,3,4-tetrahydro-3-naphthylacetamide
5-hydroxy-8-methoxy-3-methyl-1-oxo-1,2,3,4-tetrahydro-3-naphthylacetamide
6-hydroxy-5-methoxy-3-methyl-1-oxo-1,2,3,4-tetrahydro-3-naphthylacetamide
6-hydroxy-7-methoxy-3-methyl-1-oxo-1,2,3,4-tetrahydro-3-naphthylacetamide
8-hydroxy-7-methoxy-3-methyl-1-oxo-1,2,3,4-tetrahydro-3-naphthylacetamide
6-hydroxy-8-methoxy-3-methyl-1-oxo-1,2,3,4-tetrahydro-3-naphthylacetamide
8-hydroxy-6-methoxy-3-methyl-1-oxo-1,2,3,4-tetrahydro-3-naphthylacetamide
7-hydroxy-5-methoxy-3-methyl-1-oxo-1,2,3,4-tetrahydro-3-naphthylacetamide
7-hydroxy-6-methoxy-3-methyl-1-oxo-1,2,3,4-tetrahydro-3-naphthylacetamide
7-hydroxy-8-methoxy-3-methyl-1-oxo-1,2,3,4-tetrahydro-3-naphthylacetamide
5-chloro-8-butoxy-3-methyl-1-oxo-1,2,3,4-tetrahydro-3-naphthylacetamide
6-chloro-8-butoxy-3-methyl-1-oxo-1,2,3,4tetrahydro-3-naphthylacetamide
8-chloro-6-butoxy-3-methyl-1-oxo-1,2,3,4-tetrahydro-3-naphthylacetamide
7-chloro-6-butoxy-3-methyl-1-oxo-1,2,3,4-tetrahydro-3-naphthylacetamide
7-chloro-8-butoxy-3-methyl-1-oxo-1,2,3,4-tetrahydro-3-naphthylacetamide
3,8-dimethyl-5-chloro-1-oxo-1,2,3,4-tetrahydro-3-naphthylacetamide
3,8-dimethyl-6-chloro-1-oxo-1,2,3,4-tetrahydro-3-naphthylacetamide
3,6-dimethyl-8-chloro-1-oxo-1,2,3,4-tetrahydro-3-naphthylacetamide
3,6-dimethyl-7-chloro-1-oxo-1,2,3,4-tetrahydro-3-naphthylacetamide
3,8-dimethyl-7-chloro-1oxo-1,2,3,4-tetrahydro-3-naphthylacetamide
5-chloro-6-amino-3-methyl-1-oxo-1,2,3,4-tetrahydro-3naphthylacetamide
5-chloro-8-amino-3-methyl-1-oxo-1,2,3,4-tetrahydro-3naphthylacetamide
6-chloro-5-amino-3-methyl-1-oxo-1,2,3,4-tetrahydro-3-naphthylacetamide
6-chloro-8-amino-3-methyl-1-oxo-1,2,3,4-tetrahydro-3-naphthylacetamide
8-chloro-6-amino-3-methyl-1-oxo-1,2,3,4-tetrahydro-3-naphthylacetamide
7-chloro-6-amino-3-methyl-1-oxo-1,2,3,4-tetrahydro-3-naphthylacetamide
7-chloro-8-amino-3-methyl-1-oxo-1,2,3,4-tetrahydro-3-naphthylacetamide
5-bromo-8-amino-3-methyl-1-oxo-1,2,3,4-tetrahydro-3-naphthylacetamide
5-chloro-8-dimethylamino-3-methyl-1-oxo-1,2,3,4-tetrahydro-3-naphthylacetamide
3,5-dimethyl-8-hydroxy-1-oxo-1,2,3,4-tetrahydro-3-naphthylacetamide
5-butyl-8-hydroxy-3-methyl-1-oxo-1,2,3,4-tetrahydro-3-naphthylacetamide
5-amino-8-hydroxy-3-methyl-1-oxo-1,2,3,4-tetrahydro-3-naphthylacetamide
6-amino-8-hydroxy-3-methyl-1-oxo-1,2,3,4-tetrahydro-3-naphthylacetamide
8-amino-6-hydroxy-3-methyl-1-oxo-1,2,3,4-tetrahydro-3-naphthylacetamide
5-dimethylamino-8-hydroxy-3-methyl-1-oxo-1,2,3,4-tetrahydro-3naphthylacetamide.

EXAMPLE 2

(a) 26.3 G. of 3-(2,5-dimethoxybenzyl)-glutarimide (obtainable from 3-methoxybenzylmagnesium chloride and 2,6-dichloropyridine) in 600 ml. of concentrated $H_2SO_4$ is heated for 1 hour to 140°; after cooling, the mixture is poured into 200 ml. of ice water, extracted with ether, the organic phase dried over $Na_2SO_4$, the solvent distilled off, and, after purifiying the residue by chromatography, 5,8-dimethoxy-1-oxo-1,2,3,4-tetrahydro-3-naphthylacetamide is obtained, m.p. 242°–244°.

(b) Two grams of 5,8-dimethoxy-1-oxo-1,2,3,4-tetrahydro-3-naphthylacetamide is refluxed for 1 hour in 80 ml. of 10% aqueous NaOH; after cooling and acidifying, the reaction mixture is extracted with ether, dried over $MgSO_4$, the solvent is distilled off, and 5,8-dimethoxy-1-oxo-1,2,3,4-tetrahydro-3-naphthylacetic acid is thus produced, m.p. 197°–198°.

(c) 2.64G. of 5,8-dimethoxy-1-oxo-1,2,3,4-tetrahydro-3-naphthylacetic acid is dissolved in 30 ml. of ethanol and mixed with 0.4 g. of NaOH, dissolved in 15 ml. of ethanol. Under agitation, 40 ml. of ether is added dropwise and the mixture is allowed to stand for 2 hours at 0°, filtered, and the precipitate is washed twice with respectively 2 ml. of ice-cold ethanol. In this way, the sodium salt of 5,8-dimethoxy-1-oxo-1,2,3,4-tetrahydro-3-naphthylacetic acid is obtained.

(d) 5 Ml. of concentrated hydrochloric acid is added to an aqueous solution of 1.4 g. of the sodium salt of 5,8-dimethoxy-1-oxo-1,2,3,4-tetrahydro-3-naphthylacetic acid in 20 ml. of $H_2O$, and the mixture is extracted three times with respectively 10 ml. of ether. The ether phase is washed with $H_2O$, aqueous $Na_2CO_3$ solution and again with $H_2O$, dried over $Na_2SO_4$, and the solvent is distilled off, thus obtaining 5,8-dimethoxy-1-oxo-1,2,3,4-tetrahydro-3-naphthylacetic acid, m.p. 197°–198°.

EXAMPLE 3

A mixture of 80 g. of polyphosphoric acid and 2 g. of 3-(2,5-dihydroxybenzyl)-glutarimide is heated for 30 minutes to 110°, poured into 500 ml. of $H_2O$, the mixture is saturated with NaCl, extracted with ether, and the ether phase dried over $Na_2SO_4$. After distilling off the solvent and chromatographic purification, 5,8-dihydroxy-1-oxo-1,2,3,4-tetrahydro-3-naphthylacetamide is obtained, m.p. 204°–206°.

EXAMPLE 4

At 15°, dry hydrogen chloride is passed through a solution of 4 g. of 3-(3,5-dimethoxybenzyl)-glutarimide (m.p. 130°–131°) in methylene chloride. After 3 hours, the organic phase is washed several times with $H_2O$, aqueous NaOH, and once again with $H_2O$, dried over $Na_2SO_4$, and the solvent is distilled off. After chromatographic purification, one obtains 6,8-dimethoxy-1-oxo-1,2,3,4-tetrahydro-3-naphthylacetamide, m.p. 220°–221°, and after saponification according to Example 2(b), 6,8-dimethoxy-1-oxo-1,2,3,4-tetrahydro-3- naphthylacetic acid is produced, m.p. 206°–207°.

EXAMPLE 5

One gram of $AlCl_3$ is added to a solution of 2.3. g. of 3-(3-methoxybenzyl)-glutarimide (m.p. 144°–146°) in 200 ml of $CS_2$; the reaction mixture is allowed to stand for 3 hours at room temperature, poured into 200 ml. of ice water, the organic phase is washed with $H_2O$, dried over $MgSO_4$, the solvent is distilled off and, after chromatographic purification, 6-methoxyl-1-oxo-1,2,3,4-tetrahydro-3-naphthylacetamide is obtained, m.p. 182°–183°.

EXAMPLE 6

4.4 G. of 3-(3-hydroxybenzyl)-glutarimide is heated for 6 hours in 60 ml. of 48% aqueous HBr; after cooling, the reaction mixture is poured into 200 ml. of 10% aqueous sodium acetate solution, extracted with methylene chloride, dried over $MgSO_4$, the solvent is distilled off, and 6-hydroxyl-1-oxo-1,2,3,4-tetrahydro-3-naphthylacetamide is thus obtained, m.p. 130°.

EXAMPLE 7

Five grams of 3-(2-chloro-5-methoxybenzyl)-glutarimide (m.p. 140°–142°) is dissolved in 140 ml. of methylene chloride; 20 ml. of a 45% ethereal $BF_3$ solution is added thereto, and the mixture is poured, after 2 hours, into 200 ml. of $H_2O$. The organic phase is washed with $H_2O$, dried over $MgSO_4$, the solvent is distilled off, and 5-chloro-8-methoxy-1-oxo-1,2,3,4-tetrahydro-3-naphthylacetamide is produced, m.p. 241°–243°.

EXAMPLE 8

Analogously to Example 1, by employing the following starting compounds:
  3-(3-hydroxybenzyl)-glutarimide
  3-(3-methoxybenzyl)-glutarimide
  3-(2,5-dimethoxybenzyl)-glutarimide
  3-(3,5-dimethoxybenzyl)-glutarimide
  3-(2,5-dihydroxybenzyl)-glutarimide
  3-(2-chloro-5-hydroxybenzyl)-glutarimide
  3-(2-chloro-5-methoxybenzyl)-glutarimide
  3-(2-fluoro-5-hydroxybenzyl)-glutarimide
  3-(2-fluoro-5-methoxybenzyl)-glutarimide
  3-(2-bromo-5-hydroxybenzyl)-glutarimide
  3-(2-bromo-5-methoxybenzyl)-glutarimide
  3-(2-iodo-5-hydroxybenzyl)-glutarimide
  3-(2-iodo-5-methoxybenzyl)-glutarimide
  3-(2-methyl-5-hydroxybenzyl)-glutarimide
  3-(2-methyl-5-methoxybenzyl)-glutarimide
  3-(4-methyl-3-hydroxybenzyl)-glutarimide
  3-(4-methyl-3-methoxybenzyl)-glutarimide
  3-(5-hydroxy-2-nitrobenzyl)-glutarimide
  3-(5-methoxy-2-nitrobenzyl)-glutarimide
  3-[1-(3-hydroxyphenyl)-ethyl]-glutarimide
  3-[1-(3-methoxyphenyl)-ethyl]-glutarimide
  3-[1-(2-chloro-5-hydroxyphenyl)-ethyl]-glutarimide
  3-[1-(2-chloro-5-methoxyphenyl)-ethyl]-glutarimide
  3-[1-(2-bromo-5-hydroxyphenyl)-ethyl]-glutarimide
  3-[1-(2-bromo-5-methoxyphenyl)-ethyl]-glutarimide,
the following products are obtained by reaction with liquid hydrogen fluoride:
  6-hydroxy-1-oxo-1,2,3,4-tetrahydro-3-naphthylacetamide, m.p. 130°
  6-methoxy-1-oxo-1,2,3,4-tetrahydro-3-naphthylacetamide, m.p. 182°–183°
  5,8-dimethoxy-1-oxo-1,2,3,4-tetrahydro-3-naphthylacetamide, m.p. 242°–244°
  6,8-dimethoxy-1-oxo-1,2,3,4-tetrahydro-3-naphthylacetamide, m.p. 220°–221°
  5,8-dihydroxy-1-oxo-1,2,3,4-tetrahydro-3-naphthylacetamide, m.p. 204°–206°
  5-chloro-8-hydroxy-1-oxo-1,2,3,4-tetrahydro-3-naphthylacetamide
  5-chloro-8-methoxy-1-oxo-1,2,3,4-tetrahydro-3-naphthylacetamide, m.p. 241°–243°
  5-fluoro-8-hydroxy-1-oxo-1,2,3,4-tetrahydro-3-naphthylacetamide
  5-fluoro-8-methoxy-1-oxo-1,2,3,4-tetrahydro-3-naphthylacetamide
  5-bromo-8-hydroxy-1-oxo-1,2,3,4-tetrahydro-3-naphthylacetamide
  5-bromo-8-methoxy-1-oxo-1,2,3,4-tetrahydro-3-naphthylacetamide, m.p. 237°–239°
  5-iodo-8-hydroxy-1-oxo-1,2,3,4-tetrahydro-3-naphthylacetamide
  5-iodo-8-methoxy-1-oxo-1,2,3,4-tetrahydro-3-naphthylacetamide
  5-methyl-8-hydroxy-1-oxo-1,2,3,4-tetrahydro-3-naphthylacetamide
  5-methyl-8-methoxy-1-oxo-1,2,3,4-tetrahydro-3-naphthylacetamide, m.p. 223°–225°
  7-methyl-6-hydroxy-1-oxo-1,2,3,4-tetrahydro-3-naphthylacetamide
  7-methyl-8-hydroxy-1-oxo-1,2,3,4-tetrahydro-3-naphthylacetamide
  7-methyl-8-methoxy-1-oxo-1,2,3,4-tetrahydro-3-naphthylacetamide
  5-nitro-8-hydroxy-1-oxo-1,2,3,4-tetrahydro-3-naphthylacetamide
  5-nitro-8-methoxy-1-oxo-1,2,3,4-tetrahydro-3-naphthylacetamide
  6-hydroxy-4-methyl-1-oxo-1,2,3,4-tetrahydro-3-naphthylacetamide
  6-methoxy-4-methyl-1-oxo-1,2,3,4-tetrahydro-3-naphthylacetamide
  5-chloro-8-hydroxy-4-methyl-1-oxo-1,2,3,4-tetrahydro-3-naphthylacetamide
  5-chloro-8-methoxy-4-methyl-1-oxo-1,2,3,4-tetrahydro-3-naphthylacetamide, m.p. 179°–180°
  5-bromo-8-hydroxy-4-methyl-1-oxo-1,2,3,4-tetrahydro-3-naphthylacetamide
  5-bromo-8-methoxy-4-methyl-1-oxo-1,2,3,4-tetrahydro-3-naphthylacetamide.

EXAMPLE 9

Analogously to Example 1, by employing the following starting compounds:
  3-(α-naphthylmethyl)-glutarimide
  3-(9-phenanthrylmethyl)-glutarimide
  3-(2-thienylmethyl)-glutarimide
  3-(3-thienylmethyl)-glutarimide
  3-(3-benzothienylmethyl)-glutarimide,
the following products are obtained by reaction with liquid hydrogen fluoride:
  1-oxo-1,2,3,4-tetrahydro-3-phenanthrylacetamide, m.p. 215°–217°
  1-oxo-1,2,3,4-tetrahydro-3-triphenylenylacetamide
  4-oxo-4,5,6,7-tetrahydro-6-benzothienylacetamide
  7-oxo-4,5,6,7-tetrahydro-5-benzothienylacetamide
  1-oxo-1,2,3,4-tetrahydro-3-dibenzothienylacetamide.

EXAMPLE 10

12.8 G. of napphthalene and 9.9 g. of succinimide are dissolved in 200 ml. of liquid hydrogen fluoride; the solution is allowed to stand at room temperature for 48 hours; then, the largest portion of the hydrogen fluoride is distilled off, the residue poured into ice water, extracted with chloroform, dried over $Na_2SO_4$, the solvent is distilled off, and 3-(1-naphthoyl)propionamide is thus obtained.

Analogously, from
 naphthalene,
 hydroquinone dimethyl ether,
 thiophene,
by reaction with phthalimide in liquid hydrogen fluoride, the following compounds are produced:
 2-α-naphthoylbenzamide,
 2-(2,5-dimethoxybenzoyl)-benzamide,
 2-(1-thenoyl)-benzamide;
and from
 hydroquinone dimethyl ether or thiophene, respectively,
by reaction with succinimide in liquid hydrogen fluoride, the following products are obtained:
 3-(2,5-dimethoxybenzoyl)-propionamide and
 3-(1-thenoyl)-propionamide.

EXAMPLE 11

Analogously to Example 1, using the following starting substances:
 3-allylglutarimide
 3-(2-buten-1-yl)-glutarimide
 3-(2-methylallyl)-glutarimide
 3-(2-methoxyallyl)-glutarimide
 3-(1-cyclohexenylmethyl)-glutarimide,
the following compounds are produced by treatment with liquid hydrogen fluoride:
 5-carbamoylmethylcyclohexen-(2)-one
 4-methyl-5-carbamoylmethylcyclohexen-(2)-one
 3-methyl-5-carbamoylmethylcyclohexen-(2)-one
 3-methoxy-5-carbamoylmethylcyclohexen-(2)-one
 1-oxo-1,2,3,4,5,6,7,8-octahydro-3-naphthylacetamide.

EXAMPLE 12

Analogously to Example 1, using the following starting substances:
 3-(2-chloro-5-methoxy-4-methylbenzyl)-glutarimide
 3-(4-bromo-2,5-dimethoxybenzyl)-glutarimide
 3-(5-methoxy-2-methylbenzyl)-3-methylglutarimide
 3-(3-methoxy-4-methylbenzyl)-3-methylglutarimide
 3-(3-methoxy-4-nitrobenzyl)-3-methylglutarimide
 3-(2-amino-5-methoxybenzyl)-3-methylglutarimide
 3-(2-bromo-5-methoxy-4-methylbenzyl)-3-methylglutarimide
 3-(2-chloro-5-methoxy-4-nitrobenzyl)-3-methylglutarimide
 3-(2-chloro-5-methoxybenzyl)-3-n-propylglutarimide,
the compounds set forth below are obtained by treatment with liquid hydrogen fluoride:
 5-chloro-8-methoxy-7-methyl-1-oxo-1,2,3,4-tetrahydro-3-naphthylacetamide
 7-bromo-5,8-dimethoxy-1-oxo-1,2,3,4-tetrahydro-3-naphthylacetamide
 3,5-dimethyl-8-methoxy-1-oxo-1,2,3,4-tetrahydro-3-naphthylacetamide, m.p. 227°–229°
 3,7-dimethyl-6-methoxy-1-oxo-1,2,3,4-tetrahydro-3-naphthylacetamide
 6-methoxy-3-methyl-7-nitro-1-oxo-1,2,3,4-tetrahydro-3-naphthylacetamide, m.p. 157°–158°
 5-amino-8-methoxy-3-methyl-1-oxo-1,2,3,4-tetrahydro-3-naphthylacetamide, m.p. 236°–237°
 5-bromo-8-methoxy-3,7-dimethyl-1-oxo-1,2,3,4-tetrahydro-3-naphthylacetamide
 5-chloro-8-methoxy-3-methyl-7-nitro-1-oxo-1,2,3,4-tetrahydro-3-naphthylacetamide
 5-chloro-8-methoxy-3-n-propyl-1-oxo-1,2,3,4-tetrahydro-3-naphthylacetamide, m.p. 188°–189°.

EXAMPLE 13

Analogously to Example 2(b), using the following starting compounds:
 5-fluoro-8-methoxy-3-methyl-1-oxo-1,2,3,4-tetrahydro-3-naphthylacetamide
 5-chloro-8-methoxy-3-methyl-1-oxo-1,2,3,4-tetrahydro-3-naphthylacetamide
 5-bromo-8-methoxy-3-methyl-1-oxo-1,2,3,4-tetrahydro-3-naphthylacetamide
 5-iodo-8-methoxy-3-methyl-1-oxo-1,2,3,4-tetrahydro-3-naphthylacetamide
 3-methyl-1-oxo-1,2,3,4-tetrahydro-3-naphthylacetamide
 5,7-dimethoxy-3-methyl-1-oxo-1,2,3,4-tetrahydro-3-naphthylacetamide
 5,8-dimethoxy-3-methyl-1-oxo-1,2,3,4-tetrahydro-3-naphthylacetamide
 3,5-dimethyl-8-methoxy-1-loxo-1,2,3,4-tetrahydro-3-naphthylacetamide
 6-methoxy-3-methyl-7-nitro-1-oxo-1,2,3,4-tetrahydro-3-naphthylacetamide
 5-amino-8-methoxy-3-methyl-1-oxo-1,2,3,4-tetrahydro-3-naphthylacetamide
 5-chloro-8-methoxy-3-n-propyl-1-oxo-1,2,3,4-tetrahydro-3-naphthylacetamide
 5,8-dihydroxy-1-oxo-1,2,3,4-tetrahydro-3-naphthylacetamide
 6-methoxy-1-oxo-1,2,3,4-tetrahydro-3-naphthylacetamide
 6-hydroxy-1-oxo-1,2,3,4-tetrahydro-3-naphthylacetamide
 6,8-dimethoxy-1-oxo-1,2,3,4-tetrahydro-3-naphthylacetamide
 5-fluoro-8-methoxy-1-oxo-1,2,3,4-tetrahydro-3-naphthylacetamide
 5-bromo-8-methoxy-1-oxo-1,2,3,4-tetrahydro-3-naphthylacetamide
 5-iodo-8-methoxy-1-oxo-1,2,3,4-tetrahydro-3-naphthylacetamide
 5-methyl-8-methoxy-1-oxo-1,2,3,4-tetrahydro-3-naphthylacetamide
 5-chloro-8-methoxy-4-methyl-1-oxo-1,2,3,4-tetrahydro-3-naphthylacetamide
 1-oxo-1,2,3,4-tetrahydro-3-phenanthrylacetamide,
the following final products are obtained by treatment with 10% aqueous NaOH:
 5-fluoro-8-methoxy-3-methyl-1-oxo-1,2,3,4-tetrahydro-3-naphthylacetic acid
 5-chloro-8-methoxy-3-methyl-1-oxo-1,2,3,4-tetrahydro-3-naphthylacetic acid, m.p. 182°
 5-bromo-8-methoxy-3-methyl-1-oxo-1,2,3,4-tetrahydro-3-naphthylacetic acid
 5-iodo-8-methoxy-3-methyl-1-oxo-1,2,3,4-tetrahydro-3-naphthylacetic acid 3-methyl-1-oxo-1,2,3,4-tetrahydro-3-naphthylacetic acid
5,7-dimethoxy-3-methyl-1-oxo-1,2,3,4-tetrahydro-3-naphthylacetic acid
5,8-dimethoxy-3-methyl-1-oxo-1,2,3,4-tetrahydro-3-naphthylacetic acid
3,5-dimethyl-8-methoxy-1-oxo-1,2,3,4-tetrahydro-3-naphthylacetic acid
6-methoxy-3-methyl-7-nitro-1-oxo-1,2,3,4-tetrahydro-3-naphthylacetic acid
5-amino-8-methoxy-3-methyl-1-oxo-1,2,3,4-tetrahydro-3-naphthylacetic acid
5-chloro-8-methoxy-3-n-propyl-1-oxo-1,2,3,4-tetrahydro-3-naphthylacetic acid
5,8-dihydroxy-1-oxo-1,2,3,4-tetrahydro-3-naphthylacetic acid
6-methoxy-1-oxo-1,2,3,4-tetrahydro-3-naphthylacetic acid
6-hydroxy-1-oxo-1,2,3,4-tetrahydro-3-naphthylacetic acid
6,8-dimethoxy-1-oxo-1,2,3,4-tetrahydro-3-naphthylacetic acid
5-fluoro-8-methoxy-1-oxo-1,2,3,4-tetrahydro-3-naphthylacetic acid
5-bromo-8-methoxy-1-oxo-1,2,3,4-tetrahydro-3-naphthylacetic acid
5-iodo-8-methoxy-1-oxo-1,2,3,4-tetrahydro-3-naphthylacetic acid
5-methyl-8-methoxy-1-oxo-1,2,3,4-tetrahydro-3-naphthylacetic acid
5-chloro-8-methoxy-4-methyl-1-oxo-1,2,3,4-tetrahydro-3-naphthylacetic acid
1-oxo-1,2,3,4-tetrahydro-3-phenanthrylacetic acid.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of a cyclic oxo-carboxylic acid amide of the formula

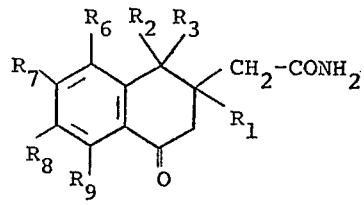

wherein $R_1$ is H, $CH_3$ or n-$C_3H_7$, one of $R_2$ and $R_3$ is H and the other is H or $CH_3$ $R_6$, $R_7$, $R_8$ and $R_9$ for each H, F, Cl, Br, I, $CH_3$, i-$C_3H_7$, n-$C_4H_9$, $CF_3$ OH, $OCH_3$, $OC_4H_9$, $OCOCH_3$, $NO_2$, $NH_2$, $N(CH_3)_2$ or $NHCOCH_3$ with the provisions that at least two of $R_6$–$R_9$ are H and that not more than one of $R_6$–$R_9$ represents a substituent from the group consisting of F, Cl, Br, I, $CF_3$ and $NO_2$, which process comprises the step of reacting (i) a cyclic dicarboxylic acid imide of the formula

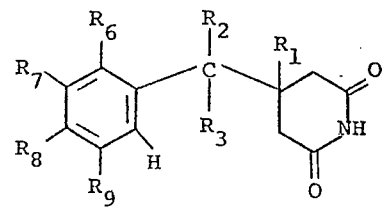

wherein $R_1$, $R_2$, $R_3$, $R_6$, $R_7$, $R_8$ and $R_9$ have the above-indicated meannings, with (ii) a Friedel-Crafts catalyst reactant to form said cyclic oxo-carboxylic amide.

2. A process according to claim 1, wherein 0.9–2.0 moles of said Friedel-Crafts catalyst is reacted per mole of cyclic dicarboxylic acid imide at a reaction temperature of −20° to +120° C.

3. A process according to claim 1 wherein the Friedel-Crafts catalyst is liquid hydrogen fluoride or polyphosphoric acid.

* * * * *